US010055554B2

(12) United States Patent
Papa et al.

(10) Patent No.: US 10,055,554 B2
(45) Date of Patent: Aug. 21, 2018

(54) SOFTWARE-ENABLED REMOTE LICENSING AND PROVISIONING

(71) Applicant: Parallel Wireless, Inc., Nashua, NH (US)

(72) Inventors: Steven Paul Papa, Windham, NH (US); Rajesh Kumar Mishra, Westford, MA (US); Michael Yasuhiro Saji, Brookline, MA (US)

(73) Assignee: Parallel Wireless, Inc., Nashua, NH (US)

( * ) Notice: Subject to any disclaimer, the term of this patent is extended or adjusted under 35 U.S.C. 154(b) by 66 days.

(21) Appl. No.: 15/059,284

(22) Filed: Mar. 2, 2016

(65) Prior Publication Data

US 2016/0259923 A1 Sep. 8, 2016

Related U.S. Application Data

(60) Provisional application No. 62/127,136, filed on Mar. 2, 2015.

(51) Int. Cl.
*G06F 7/04* (2006.01)
*G06F 21/10* (2013.01)
*H04W 12/08* (2009.01)

(52) U.S. Cl.
CPC .......... *G06F 21/105* (2013.01); *H04W 12/08* (2013.01); *G06F 2221/0773* (2013.01); *H04L 2463/101* (2013.01); *H04L 2463/103* (2013.01)

(58) Field of Classification Search
CPC .......... G06F 21/105; G06F 2221/0773; H04W 12/08; H04L 2463/103; H04L 2463/101

USPC .......................................................... 726/30
See application file for complete search history.

(56) References Cited

U.S. PATENT DOCUMENTS

| 8,279,786 | B1 | 10/2012 | Smith et al. |
| 8,654,721 | B2 | 2/2014 | Mueck |
| 9,191,839 | B2 | 11/2015 | Bienas et al. |
| 2004/0205164 | A1* | 10/2004 | Jacobs .............. H04M 1/72525 709/219 |
| 2007/0077903 | A1† | 4/2007 | Hassan et al. |
| 2008/0134276 | A1† | 6/2008 | Orrell et al. |
| 2008/0220764 | A1 | 9/2008 | Bose et al. |

(Continued)

*Primary Examiner* — Mohammad W Reza
(74) *Attorney, Agent, or Firm* — Michael Y. Saji; Keyur Parikh

(57) ABSTRACT

Described herein are systems and methods for providing software provisioning of functionality in a wireless communications device. Software-enabling functionality may include systems for granting a license to intellectual property or other pre-embedded functionality within a device. Communications to and from the device may be used to send or receive activation messages and/or licensing messages. Network capabilities may be provisioned using activation messages sent over the network. Activation messages may be sent in-band or out-of-band, for a device connected to the Internet and/or a mobile operator core network. Licenses may be required for any functions or intellectual property present on a given device. Activation may enable logical modules of a system-on-chip (SOC), functions of a software-defined radio (SDR), baseband, or DSP core. The disclosed systems and methods could thereby provide a new, flexible paradigm, namely, "Silicon as a Service (SaaS)."

19 Claims, 4 Drawing Sheets

(56) References Cited

U.S. PATENT DOCUMENTS

| | | | |
|---|---|---|---|
| 2011/0113122 A1* | 5/2011 | Drope | G06F 17/30017 709/219 |
| 2012/0151574 A1† | 6/2012 | Zhang et al. | |
| 2013/0017792 A1 | 1/2013 | Miller, II | |
| 2014/0237547 A1 | 8/2014 | Bose | |
| 2015/0295786 A1* | 10/2015 | Levesque | H04L 63/20 455/410 |

* cited by examiner
† cited by third party

SOFTWARE-ENABLED REMOTE LICENSING AND PROVISIONING

CROSS-REFERENCE TO RELATED APPLICATIONS

This application claims the benefit of priority under 35 U.S.C. § 119(e) of U.S. Provisional Patent Application No. 62/127,136, filed on Mar. 2, 2015 and entitled "Software-Enabled Remote Licensing and Provisioning," which is hereby incorporated by reference in its entirety for all purposes. The present application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14,034,915, "Dynamic Multi-Access Wireless Network Virtualization," filed Sep. 24, 2013; U.S. patent application Ser. No. 14,289,821, "Method of Connecting Security Gateway to Mesh Network," filed May 29, 2014; U.S. patent application Ser. No. 14,500,989, "Adjusting Transmit Power Across a Network," filed Sep. 29, 2014; U.S. patent application Ser. No. 14,506,587, "Multicast and Broadcast Services Over a Mesh Network," filed Oct. 3, 2014; U.S. patent application Ser. No. 14,510,074, "Parameter Optimization and Event Prediction Based on Cell Heuristics," filed Oct. 8, 2014, U.S. patent application Ser. No. 14,642,544, "Federated X2 Gateway," filed Mar. 9, 2015, and U.S. patent application Ser. No. 14,936,267, "Self-Calibrating and Self-Adjusting Network," filed Nov. 9, 2015, each in its entirety for all purposes.

BACKGROUND

Currently, mobile devices provide a plethora of functionality and are constantly in communication with the Internet. Additionally, a number of communications functions, including radios, baseband processors, and general purpose processors are being combined onto a single chip. It is desirable to create chips that include multiple functions, where only some functions are enabled, and to enable certain functions remotely via a communications network. Thus, it is inexpensive to produce and sell silicon devices with unused capacity, and providing excess capacity can be economically advantageous when the cost of production of a silicon chip is based on the number of units made. Stated another way, the cost of a single additional processor core or a single additional radio on a chip is low, and it makes sense in some cases to design a more complex chip and activate only a subset of the functionality on the chip. However, it is at present difficult to obtain payment for only the subset of functionality that a user is using at any given time.

Additionally, much of today's wired and wireless network infrastructure is heavily utilized during peak times, but is underutilized at other times. This underutilization is analogous to empty seats on an airplane, which would ideally be filled to provide a greater return to the network operator. Overutilization (overbooked seats) on one network resource (a first airplane) would ideally be able to be shifted to another underutilized network resource (passengers being rebooked on a second airplane).

SUMMARY

Described herein are systems and methods for providing software provisioning of functionality in a wireless communications device. Software-enabling functionality may include systems for granting a license to intellectual property or other embedded functionality within a device, allowing functionality otherwise not available to be made available for use. Communications to and from the device may be used to send or receive activation messages and/or licensing messages. Network capabilities may be provisioned using activation messages sent over the network. Activation messages may be sent in-band or out-of-band, for a device connected to the Internet and/or a mobile operator core network.

Licenses may be required for any functions or intellectual property present on a given device. In some embodiments, an activation message may enable logical modules of a system-on-chip (SOC). In some embodiments, the activation message may enable functionality present in a system or a chip. In some embodiments, the activation message may enable individual chips present within a system. In some embodiments, activation messages may be used to enable one or more devices or chips that are added to a system after its initial purchase. In some embodiments, an activation message may enable one or more functions of a software-defined radio (SDR). In other embodiments, an activation message may enable one or more functions of a digital signal processing (DSP) core. In some embodiments, an online store may be used to enable activation messages. Licenses or license codes may be sold via the store, and messages may be sent to a specified device via an activation server. The disclosed systems and methods could, in some respects, provide a new, flexible paradigm, namely, "Silicon as a Service (SaaS)".

DETAILED DESCRIPTION

Figure 1:
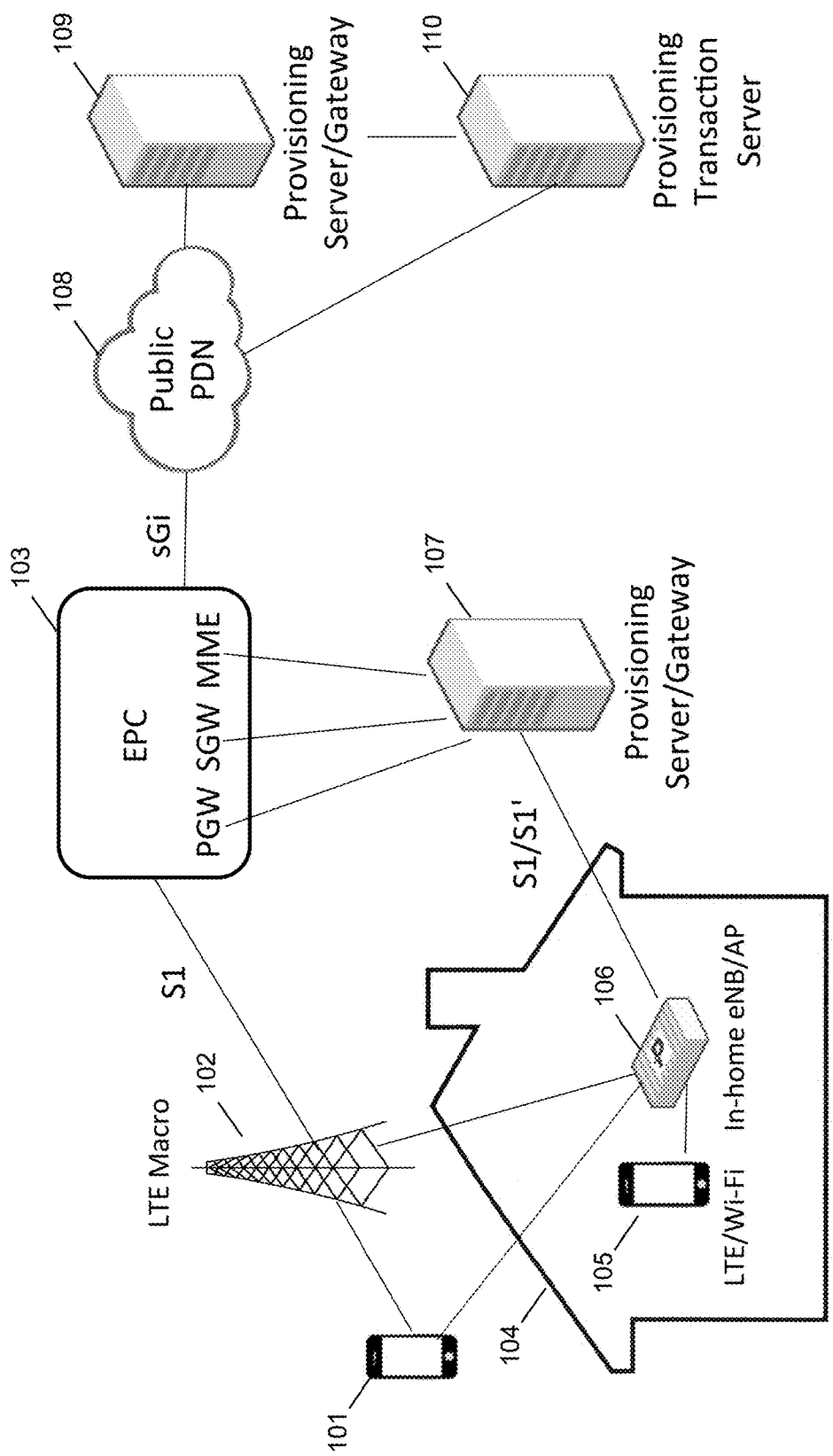
FIG. 1 is a network architecture diagram in accordance with some embodiments.

In some embodiments, a process is provided for provisioning a silicon device where a customer pays for the use of the already-embedded device with functionality only usable when provisioned. The user may be a carrier, an operator, an individual home user, or another user. Provisioning network capabilities may be enabled in a way similar to selling apps in an app store, but with additional silicon devices being activated by a controller. In some embodiments, these network capabilities may include provisioning a mesh wireless link, provisioning a link over licensed spectrum for a consumer, provisioning a link for an enterprise, and provisioning a backhaul link for use by a carrier.

In some embodiments, real-time licensing of spectrum may be enabled, specifically, by costing alternative sources of capacity at a given time. Assuming that a given user will be able to be served by more than one means of access, the system may determine that one of those means is available on an on-demand basis with a marginal cost, and the system may weigh, or permit weighing of, that marginal cost against the marginal value of the capacity it frees up. This capability becomes particularly useful in the context of cellular access point densification and software defined radios with fungible backhaul and access.

When providing remote provisioning for connectivity, the radios in silicon can be manufactured within an integrated system-on-chip at very low cost, and the silicon parts for baseband as well. The proliferation of such devices will not only allow a user to provision additional radios or cores as needed at a given time, in some embodiments, but to utilize unused capacity in neighboring devices that contain similar chips with provisionable capabilities.

In some embodiments, a wireless system compromised of multiple radios and baseband processors, any of which can enabled to produce LTE, 3G, 2G, Wi-Fi, or other wired or wireless protocols or signals, can be activated through provisioning and the license for the use of the radio is paid at the time of activation. The licenses may be one-time, term, permanent, for specific use cases (backhaul for less than 30 Mbps only, LTE only, part of a bundle like "broadband link insurance," etc.). The licenses may apply to one user, multiple users, or a dynamic set of users. The licenses may provide a pooled allotment of bandwidth or data transmitted, for one or more users.

The licenses may be for a specific radio at a specific time. The licenses could be made according to a type of traffic (e.g., video), a use cause (e.g., user-initiated video call), with a bandwidth guarantee or on a best-effort basis. The licenses may provide a minimum or maximum bandwidth guarantee, which may be a dynamic guarantee, such that the guarantee could change over the period of the license (for example, when transitioning from peak to non-peak times). Provisioning may be performed via an internet/cloud service.

In some embodiments, the enabled functionality may relate to provisioning network interfaces or network links. For example, a mesh wireless link of a network gateway may be provisioned using an activation message subsequent to the purchase of the network gateway. A network operator may purchase the network gateway at an initial point in time, and connect the network gateway to an initial network, such as a wired network, providing a certain level of functionality and network routing performance. At a subsequent time, the network operator may discover that the wired network connection is insufficient or has become disabled. At that time, the network operator may connect to an activation server and purchase a license for wireless backhaul functionality. The license could then be used to immediately activate the wireless backhaul functionality at the network gateway. Assuming network connectivity is available, the functionality could be activated remotely, over the network, without needing a network engineer or service technician to visit the network device.

In some embodiments, given a mobile device and several nearby systems that can provide wireless access to that device, a central coordination server may be used to facilitate wireless access. For example, the central coordination server may be aware of each of the several nearby systems, either on its own or via messages from the nearby systems. The central coordination server may assess a number of factors to determine which system is best suited to deliver wireless access. One of the factors may be cost, and a costing function may be run at the central coordination server, in some embodiments using a multiple-agent auction, or in other embodiments using a real-time costing algorithm such as a shortest-path routing cost algorithm. Such an algorithm could use various factors, such as application type, typical and current capacity, total available capacity, and other factors to identify favorable outcomes and assign them the lowest "cost." Other factors that may be used are wireless signal strength to the mobile device at that location from a particular base station; the rate of speed that a mobile base station and/or wireless device is moving; and the instantaneous availability of spectrum or capacity at one or more base stations. For example, costing could be performed by comparing the cost of a particular route versus an unprovisioned route, and the agreed-upon metric could be marginal value of freed capacity versus marginal cost of newly-provisioned capacity.

Further embodiments and applications of this functionality for enabling network resource functionality remotely exist. For example, a cable Internet network provider may provide a backup link for the cable Internet connection via a software-defined radio using a Long-Term Evolution (LTE) network connection. This backup link could be licensed individually per consumer by a network operator. The right to use this backup link could alternatively be purchased by the consumer.

As another example embodiment, a wireless network operator may provide a Wi-Fi gateway for use in a wireless subscriber's home. At an additional per-month cost, the wireless subscriber could be authorized to use the Wi-Fi gateway as a femto cell. At an additional per-month cost, paid by the wireless subscriber, the wireless subscriber could be authorized to activate a radio within the Wi-Fi gateway to access the wireless network operator's licensed wireless network spectrum, in addition to the Wi-Fi spectrum. These capabilities could be provisioned on and off at any time based on choices made by the network operator and/or the home user. These capabilities could be provided on a single silicon system-on-chip (SOC) in the Wi-Fi gateway, such that additional functionality could be added via remote activation.

As another example embodiment, the above Wi-Fi gateway may be provisioned for use as an LTE eNodeB (evolved NodeB) base station. Based on remote activation, the gateway may be enabled to switch between wireless bands, such as LTE Band 3 to LTE Band 20. Based on remote activation, the gateway may be enabled to provide advanced LTE functionality, such as that described in LTE-Advanced (LTE-A), at a later date. A Wi-Fi gateway could provide carrier aggregation, as an example of advanced LTE functionality that may be enabled via remote activation.

LTE-A or subsequent LTE features could be downloaded in software or firmware via a remote network connection, in some embodiments. Remote activation may thus be interpreted within the scope of this disclosure to refer both to remote activation and remote download of software, source code, object code, authentication tokens, configuration information, network addresses for configuration, network credentials or other credentials, or other instructions for enabling functionality at the target device.

Further examples of functionality or resources that may be enabled on a device using remote activation include: prioritization, such as prioritization of cell signal of certain users at one or more base stations; an increased data rate, so that network operators may provide higher data rates that can be turned on and off at the user's discretion; or other functionality.

Further examples of functionality or resources that may be enabled on a device using remote activation include: a backup wireless connection; femto or home eNodeB (HeNB) service; a license for access to a specific band of wireless spectrum; a license to offload all or part of a wireless base station's load to another wireless base station, such as a macro cell; a license to use a secondary macro cell as a backup, including a secondary macro cell on a wireless operator's network different than the network for a first macro cell; licenses to provide wireless service within a given sector; licenses to use television white space (TVWS) bands, for wireless backhaul and/or service, including on a per-link or per-subscriber basis; wireless beacon functionality; or other functionality.

Further examples of functionality or resources that may be enabled on a device using remote activation and provisioning include: processor cores; software-defined radios; digital signal processors (DSPs) and/or DSP cores; functionality for a given radio access technology, e.g., 2G, 3G, UMTS, LTE; additional radios and radio transceiver chains; radio filters; radio amplifiers; the right to use a given piece of hardware or subset of hardware during a particular time of day; the right to use a frequency band, including a sublicense from the rightful spectrum user as registered with the local national regulatory body; the ability to use an unlicensed spectrum band; the ability to use a given frequency band by causing other signal emitters under the operator's control to cease emitting interference in that band; a fraction of bandwidth on a particular link, including a backhaul link or fronthaul link; a new mesh link; a microwave link; the ability or right to use an unlicensed or lightly-licensed band, including the global industrial, scientific and medical (ISM) bands, 2.4 GHz bands, 3.5 GHz bands, TV whitespace bands, and other bands; tilting or turning of directional antennas; the right to use a distributed antenna system (DAS) or colocated baseband (e.g., centralized radio access network or C-RAN); small cells or nearby small cells; the right to use a predictive model or user data collection; the right to broadcast at or above a particular power level within a particular geographic area; or other resources.

Further examples of functionality that may be enabled on a device using remote activation include: functionality on a digital signal processor, including baseband or remote baseband functionality; functionality for interoperating and/or coordinating one or more devices in an Internet of Things; or other functionality. Trading of functionality and/or licenses between parties at an arbitration server or authorization server may be contemplated, in some embodiments, such as the use of one company's wireless spectrum to allow a second company to provide wireless access or wireless beacon service. In some embodiments, incentives may be provided from a first company to a second company to allow the second company to use the first company's network, spectrum, bandwidth, or other resources to provide primary service to the second company while using the second company's resources to provide backup service for the first company, in some embodiments. The use of the second company's resources may involve the use of the second company's network interface(s) to provide wireless access for wireless users of the first company who are within a "cell edge" area not near the center of a macro cell, in some embodiments.

In some embodiments, a wireless operator may assess conditions at a cell edge and/or a mobile base station, and decide whether or not the mobile base station should use secondary network capabilities to provide access to a mobile device in lieu of the operator's primary macro cell being used for providing access to the mobile device. In some embodiments, this mobile base station may be in a car or other vehicle.

In some embodiments, a negotiation may be performed with one or more servers belonging to other parties, such as other wireless operators, to determine whether the other parties can provide service and what cost the alternative service would be priced at, before the coordination server selects a single system to provide access. In some embodiments, such a negotiation may involve a negotiation pertaining to a service level agreement (SLA). In some embodiments, probabilistic models may be used to determine the projected duration and time of services to be provided.

Once a system is identified, an activation message may be sent to one or more devices to, for example, provision the wireless access interface, to acquire a license to use a given spectrum allocation, or to acquire a license to use particular technology or functional modules. The mobile device may then be granted access. A costing process may be used for obtaining licenses to other services and/or functionalities, in addition to wireless access, in some embodiments.

In some embodiments, a low-cost integrated system-on-chip may have multiple functionalities or functional modules, but may be sold at a low cost with only one or with a small number of modules activated. The additional functionalities may be activated at a time after the first sale, on an as-needed basis. The additional functionalities may be activated by an activation server via an activation message, which may also allow activations and deactivations to be performed rapidly, i.e., within the sub-second timeframe expected for a network message to propagate through the network.

In one embodiment, real-time licensing via a controller is enabled on a hardware system-on-chip that includes four wireless radios that are 2 mm×2 mm in size with on-chip tunable power amplification, a CPU that is 5×5 mm, a memory chip, a UE baseband block, a femto base station block, and ports for radio antennas. Such a system-on-chip could be used in every access point, femto cell, and edge router, and at high volumes could be inexpensive to produce, while still supporting a multiplicity of licenses and provisioning options. The system can also include application processors that can each similarly be provisioned, and licensed, by application or capacity, separate from the installation of the processor.

Various additional scenarios are also contemplated.

For example, a wireless telecom operator such as AT&T may want to "rent out" a home user's Wi-Fi hotspot, potentially as backup to augment its own network's capacity. Instead of requiring the home user to use an AT&T hotspot and providing a separate Wi-Fi network/service set identifier (SSID) outside of the user's control, this service could be dynamically provided, to any and all interested parties, and service could be configured such that assistance at different times of day could be priced differently. A wireless operator could charge consumer subscribers to have femto service coverage added to their home, and additionally may permit home users to augment Wi-Fi service using licensed spectrum bands, for a fee.

As another example, a broadband cable company could provide "broadband link insurance," so that the home user can access alternate backhaul if needed by renting capacity on a wireless operator's network. The broadband cable customer may pay a set rate per month, and the broadband cable operator may pay on an as-needed basis to rent wireless capacity from whatever wireless provider has the best rate at the time the service is needed.

As another example, two wireless network operators may enter into an agreement to rent each other's towers when overloaded, enabling them to effectively share frequency bands. As another operator to operator example, two operators could share a single backhaul connection and monitor its usage such that each operator pays only for its own used backhaul bandwidth.

As another example, if a wireless hardware operator can include spare cores or spare chips on a hardware device, the additional chips or cores can be activated immediately when the prior core fails, dramatically reducing downtime, response time, and even the cost of servicing spares and repairs.

As another example, a wireless operator may increase macro capacity by offloading cell edge users to a Wi-Fi network with wired backhaul. Users may be interested in connecting their networks to this type of resource controller to get the benefit of using licensed spectrum. As another example, software may be enabled to run on the processor or digital signal processor (DSP) of an existing device to enable an internet of things (IOT) hub.

As another example, adding a second macro link for more capacity on a different wireless operator may allow two wireless carriers to jointly offer a home broadband product and share the load, or a mobile virtual network operator (MVNO) across multiple carriers.

As another example, a wireless operator may activate or deactivate base stations per sector and per software-defined network (SDN) link managed by the controller, for purposes of reducing software and hardware purchase costs and licensing fees.

As another example, a TV station that owns a TV channel can charge to use its spectrum on a per link basis, or a carrier can charge to use its spectrum on a per link basis, and in exchange force the purchaser to create femto access that offloads the carrier's macro further.

As another example, a large retailer may be enabled to leverage a wireless operator's licensed backhaul to reduce the cost of installing location beacons near zero cost, by renting additional access frequencies to the wireless operator to offload cell edge users in areas close to the retailer's stores.

As another example, a wireless operator may provision an inactive femto in a car so that the in-vehicle femto may use a backhaul link provided by the car, thereby reducing or limiting demand on cell edge even if user isn't yet a subscriber for their car.

As another example, all of the above could be identified and cataloged in an "online store" environment for mobile operators to pick and choose from.

In this disclosure, although activation messages and remote activation are described, the disclosure is intended to apply to techniques for deactivation and messages thereto, as well. For example, a license may be granted for use of a particular function on a cellular-connected device over a specified period of time. The license may be revoked after the time has elapsed, either at the device itself or over the network via a deactivation message sent by a license server or tracking server. Activation and deactivation may be understood to be remote provisioning. Other implementations of remote provisioning may be understood by one of skill in the art according to widely-available and understood network communication technologies.

In this disclosure, where LTE or another network technology is described, except where otherwise technically inapplicable, any of the following network technologies are contemplated: 2G (GSM), 3G (UMTS, CDMA, CDMA2000), 4G/5G LTE/LTE-A, Wi-Fi (802.11a/b/g/n/ac/ad), or other technologies are expressly contemplated, with multiple radio access technologies used at once being expressly contemplated As well, wired technologies are contemplated, such as versions of the Data Over Cable Service Interface Specification (DOCSIS), or 10/100/1000 or faster Ethernet.

FIG. 1 is a network architecture diagram in accordance with some embodiments. User equipment (UE) 101 is connected to macro cell 102. UE 105 is connected to in-home eNodeB/Wi-Fi access point (AP) 106. UE 105 and eNB/AP 106 are within a home, shown in the figure as 104. Macro cell 102 is connected to evolved packet core (EPC) 103 over an S1 protocol, which contains a packet gateway (PGW) functionality, a serving gateway (SGW) functionality, and a mobility management entity (MME) functionality. EPC 103 may also be, in some embodiments, a universal mobile telecommunications system (UMTS) or 3G core, a 2G core, an IP multimedia subsystem (IMS) core, or some combination thereof. eNB/AP 106 is connected to provisioning server/gateway 107, using a standard S1 protocol and/or a non-standard S1 protocol (S1'), which is connected to EPC 103. Provisioning server/gateway 107 may provide additional services in addition to resource provisioning, such as an X2 gateway, an S1 virtualization proxy, an Iuh proxy, a security gateway, or other services.

The EPC serves as a gateway to a public packet data network 108, which may be the public Internet. On the other side of the EPC 103, at or beyond the sGi anchor point, and coupled to EPC 103 via the public packet data network (PDN) 108, are additional provisioning server/gateway 109 and provisioning transaction server 110. The functions of provisioning servers 107, 109, and 110 may be redistributed among different network nodes, in some embodiments. The functions of provisioning servers 107, 109, and 110 may be combined on a single server, which may be located at the location of server 107, or at the location of server 109, in some embodiments. The functions of provisioning servers 107, 109, and 110, or a subset thereof, may be located at in-home eNB/AP 106, in some embodiments. The functions of provisioning servers 107, 109, and 110 are described throughout the present disclosure.

In operation, the provisioning can be initiated by the edge node itself, here the eNB/AP 106, which may identify a need to activate the unused resources, send a request to a cloud provisioning server, and obtain an appropriate license. Suppose in-home eNB/AP 106 has extra capacity on a wired backhaul link. Suppose also that LTE macro 102 has a saturated backhaul link. In some embodiments, macro 102 may request that in-home eNB/AP 106 provision an additional backhaul link so that macro 102 can offload its saturated backhaul link. Macro 102's request may be sent to provisioning server 107 directly, or via eNB/AP 106. Macro 102's request may then cause a costing function to be run at the provisioning server. The provisioning server 107 may require input from provisioning server 109, in some embodiments, such as when provisioning server 109 is controlled by a third party and has costing information needed for the transaction, such as the current price of IP licensing rights for the resource to be provisioned.

Continuing on with operation, provisioning server 107 may complete any needed financial or legal transaction, and may then send a provisioning instruction via a secure channel to in-home eNB/AP 106, which then activates and configures an additional radio to serve as a backhaul link for macro 102. This enables macro 102 to dynamically and inexpensively increase its backhaul capacity on short notice, and also enables the owner of eNB/AP 106 to rent its excess capacity.

In some embodiments, the secure channel may be tunneled or otherwise encapsulated. The secure channel may be enabled to pass through gateways, including through gateways on the public Internet, providing "over-the-top" service. The secure channel may be anchored at a provisioning server and at the node that is being controlled by the provisioning server, such as eNB/AP 106.

In some embodiments, the one or more provisioning servers may be located on the public Internet, or on an operator core network, or at a network location that is accessible from multiple operator core networks and from multiple radio access technology core networks, such as at a network peering point.

In some embodiments, a provisioning server may have another secure channel with another server, such that the two servers communicate and coordinate the identification of resources and the payment for the remote provisioning of the resources by communicating among each other. Bidding, auctions, set pricing, and other pricing arrangements between the two servers are contemplated.

Figure 2:
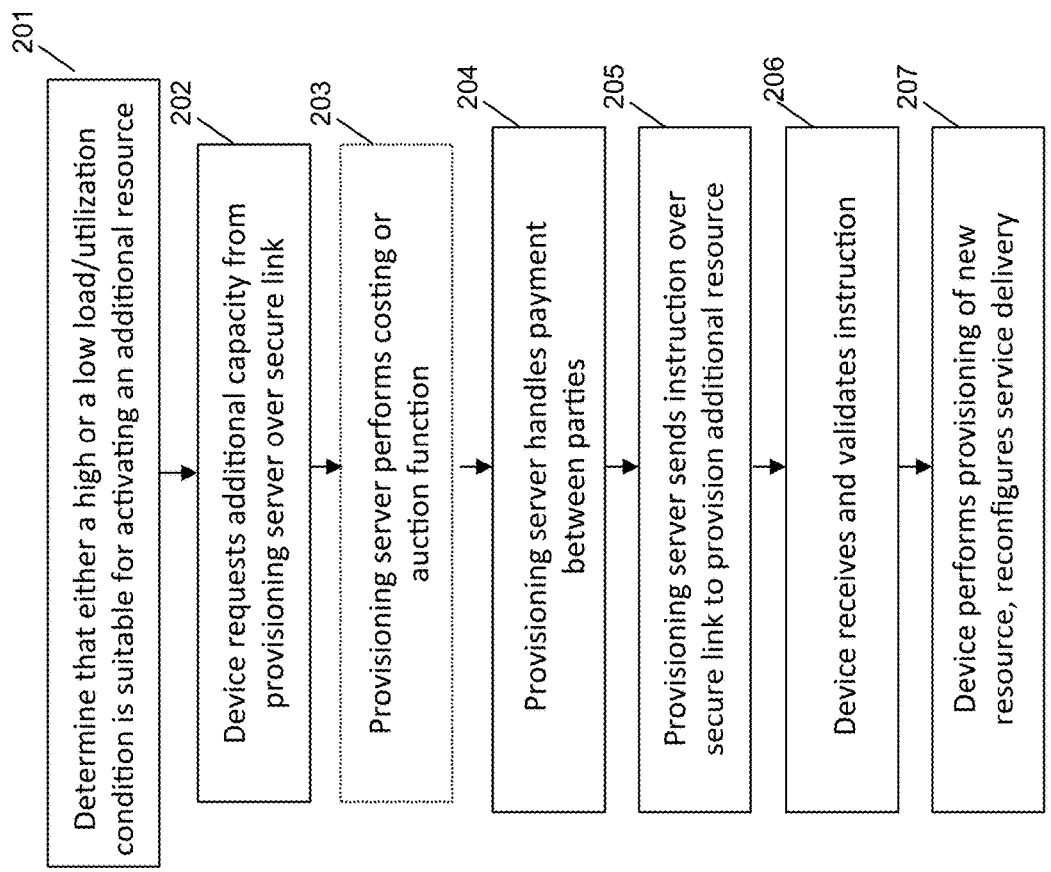
FIG. 2 is a flowchart in accordance with some embodiments.

FIG. 2 is a flowchart in accordance with some embodiments. The flowchart describes steps and methods performed at either a base station or a provisioning server, in accordance with some embodiments. At step 201, a base station determines that either a high or a low load or utilization condition is such that it is suitable for requesting activation of an additional resource, or for advertising availability of an additional resource for use by another node. For example, a base station that is idle may advertise its processors, baseband, and/or radio interfaces for use by other nodes. As another example, a base station that is at capacity may determine that there are resources that are available at the local node or at nearby nodes but that are not provisioned, and may determine that a request for these resources is in order.

The capacity and/or utilization condition may include one or more of processing load, total capacity, percentage of capacity used, throughput, latency, jitter, operating temperature, or another condition, in accordance with some embodiments. The capacity and/or utilization condition may be assessed with respect to an individual processor, a processor core, an individual link or connection or interface, an individual frequency band, or another resource, including all of the resources described herein. Capacity at one node or resource may be compared to capacity at another node or resource; for example, if a two-core CPU has one idle and non-provisioned CPU core and one CPU core running at capacity, capacity measures at both cores may be considered.

With respect to the description of FIG. 2 that follows, each step is described with respect to the situation where provisioning occurs at the local base station and is based on requesting additional resources from a provisioning server. However, the scenario of resources being advertised is also contemplated to include variations of the following steps.

At step 202, once it has been determined that additional capacity is required, the local base station may request additional resources. The request is performed by the local base station over a secure link to a provisioning server. The request may identify a specific resource that is requested. The request may be authenticated and encrypted. The request may include other information suitable for use by the provisioning server. The link may be a preexisting secure link, an ad-hoc link, or the link may be created at the time the request is created in order to send it, and may be, for example, a generic routing encapsulation (GRE) or IPSec tunnel, a general packet radio service (GPRS) tunneling protocol (GTP) tunnel, a secure shell (SSH) connection, a Hypertext Transport Protocol Secure (HTTPS) connection, or another secure link. Goals of the secure link may include confidentiality, data integrity, origin authentication, and non-repudiation.

Keys may be stored on the hardware device, such as in a secure hardware area of the device. The secure link may be provided using a web service at the provisioning server, in some embodiments, which may use a simple object access protocol (SOAP) protocol. In some embodiments, to provide transaction-like semantics for the request, the request may include a timestamp. The provisioning server may receive the request and initiate steps to fulfill the request. If two timestamps are identical or near-identical, the duplicate entries may cause a request to fail, which may cause the initiating server to detect a timeout and retry the transaction, thereby reducing the likelihood that two parties will inadvertently contend for the same resource. In some embodiments, a blockchain, such as used by Bitcoin, could be used for storing and verifying transactions in sequence.

At step 203, the provisioning server may perform a costing or auction function. This may be a simple function, such as obtaining a set price from a database of available services with prices. This may also entail communicating with a third party, such as an owner of a second base station that is advertising its availability to fulfill the request for the desired resource, and requesting the prices from the third party. This may also entail comparing the price with an internal price threshold, with another price, with an opportunity cost. The opportunity cost may be an opportunity cost of not procuring the desired resource, estimated using a preexisting model of costs. The costs may be financial, or may be in currencyless, unitless numerical values. In the case that the third party is another automated system, the provisioning server may initiate an auction or other automated price determination system in cooperation with the third party system to determine the price or cost.

At step 204, the provisioning server determines if any money or other payment is required, and facilitates payment. In some embodiments, payment may be provided using electronic payment systems, such as automated clearing house (ACH) systems, Bitcoin, Square, Stripe, PayPal, credit card payment, or other electronic payment systems. In some embodiments, payment may be provided as in-kind services at a later date. In some embodiments, the parties to the electronic transaction may have legal agreements in place to protect the parties, to properly license any intellectual property that is required to operate the resource that is being provisioned, and to meet any other legal obligations.

At step 205, the provisioning server sends an instruction over a secure link or channel to provision an additional resource, which has now been paid for. If the resource is at the requesting base station, the secure link may be the link used by the provisioning server to communicate with the requesting base station. If the resource is under the control of a third party, the provisioning server may instruct the third party to provision the resource, and may report that the resource is available to the originally-requesting base station once the third party reports that the resource has been properly provisioned. A secure link is helpful in allowing the resource owner to verify that the resource to be provisioned has been paid for.

At step 206, the device with the newly-provisioned resource receives the provisioning instruction and validates the instruction. Validation may include decryption using a secure key, matching of source IP headers, source IP addresses and port numbers, IP signature information, and/or other envelope information to verify the sender, and so on. In some embodiments, the provisioning server may use its own key to sign and encrypt the instruction. In some embodiments, the provisioning server may use its own key and a key specific to the target device. In some embodiments, instructions that are received outside of a short time window after payment may be rejected, as an additional verification mechanism and as a way to provide transaction semantics for the exchange of messages. If an instruction is received to provision a resource, and the resource has already been provisioned or is no longer available, the instruction may be replied to with an error message, in some embodiments.

At step 207, the device with the newly-provisioned resource performs provisioning of the new resource and configures it for service delivery. Configuration of the new resource may be retrieved over the network, from the provisioning server, or from the device itself. For example, a newly-provisioned processor core may be provisioned with information such as the duration that the provisioning will last, and any operational data needed to provide functionality, with the already-active cores of the processor being reconfigured to distribute tasks to the newly-activated processor core. As another example, a newly-provisioned radio backhaul channel may be provisioned with transmit power and frequency band, neighbor lists, a direction to point the antenna, the network configuration of the new backhaul network, the speed of the new backhaul link, and so on, with the already-active device being reconfigured to allocate the new backhaul link to offload any existing backhaul links. Once reconfiguration is complete, service may be delivered using the newly-provisioned resource.

In some embodiments, not all of the above steps may be needed. For example, costing/auction function 203 and payment 204 may be omitted if a single operator is performing all of the steps. As another example, the provisioning server itself, or another network node that is the requesting device, may initiate the steps, or a human operator may omit step 201 and may directly initiate resource provisioning, or provisioning may be initiated on a pre-scheduled basis.

Figure 3:
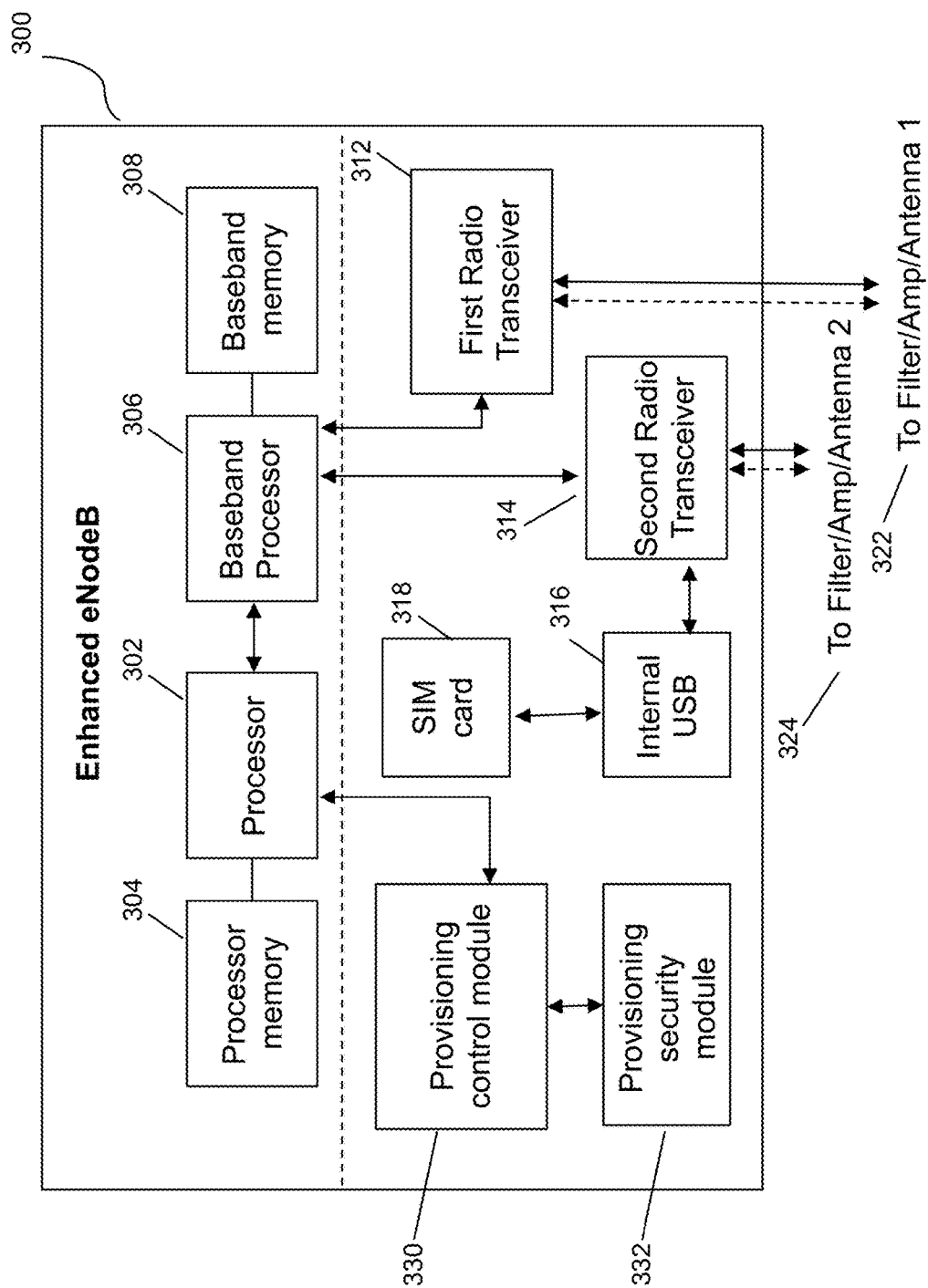
FIG. 3 is a block diagram of an enhanced eNodeB, in accordance with some embodiments.

FIG. 3 is a block diagram of an enhanced eNodeB, in accordance with some embodiments. Enhanced eNodeB 300 may include processor 302, processor memory 304 in communication with the processor, baseband processor 306, and baseband processor memory 308 in communication with the baseband processor. Enhanced eNodeB 300 may also include first radio transceiver 310 and second radio transceiver 312, internal universal serial bus (USB) port 316, and subscriber information module card (SIM card) 318 coupled to USB port 314. In some embodiments, the second radio transceiver 312 itself may be coupled to USB port 316, and communications from the baseband processor may be passed through USB port 316.

Processor 302 may identify the appropriate network configuration, and may perform routing of packets from one network interface to another accordingly. Processor 302 may use memory 304, in particular to store a routing table to be used for routing packets. Baseband processor 306 may perform operations to generate the radio frequency signals for transmission or retransmission by both transceivers 310 and 312. Baseband processor 306 may also perform operations to decode signals received by transceivers 310 and 312. Baseband processor 306 may use memory 308 to perform these tasks.

Processor 302, baseband processor 306, memory 308, or any of the other silicon components described herein may include multiple cores or functionalities on the same chip, and may enable communication according to multiple frequencies, modes, or radio access technologies, in some embodiments. One or more of the functional modules may be combined to form a system-on-chip (SoC), in some embodiments, with additional modules being enabled to be remotely provisioned after the device leaves the factory. A highly-integrated SoC with redundant or extra cores is well-suited to later provisioning in this way. Extra memory and extra flash storage are also remotely provisionable. In some embodiments, processor 302 and/or other processors described herein include microarchitecture for enabling and disabling portions of the chip according to authenticated control instructions. In some embodiments, a request may be passed to a special hardware register to be authenticated and evaluated and to cause enabling and disabling to occur; in other embodiments, a received request may be passed to a low-level operating system callback to authenticate, decrypt, evaluate, and execute an enabling or disabling command.

Enhanced eNodeB 300 may also include provisioning control module 330, in some embodiments, in communication with processor 302. The provisioning control module may be in communication with provisioning security module 332. Provisioning control model may perform functions pertaining to provisioning as described herein, including: identifying when a new remote resource (e.g., a new mesh link for backhaul to another node) is available; identifying when a new remote resource is needed to be provisioned; identifying when a new local resource (e.g., unused backhaul capacity) is available; identifying when a utilization parameter is met and a new remote resource provisioning request should be sent to a provisioning server; identifying when a utilization parameter is met and a a new local resource should be advertised as available to a provisioning server; sending and receiving provisioning messages to and from a provisioning server as described herein; and other functions.

Provisioning security module 332 may assist provisioning control module 330 in performing security-related functions, including encrypting and decrypting messages to and from a provisioning server; verifying keys that are stored on the eNodeB 300 against messages received from a provisioning server; verifying the authenticity of messages received from a provisioning server; verifying the identity of a provisioning server; verifying the consistency and timeliness of messages received from a provisioning server; and other functions pertaining to security, authentication, and encryption as required for provisioning. In some embodiments provisioning security module 332 may provide hardened secure key storage and management, and may be the sole repository of certain security information in the system, to avoid malicious third parties from compromising the security of other devices in the system.

In some embodiments the functions described above with respect to the provisioning control module 330 and provisioning security module 332 may be performed on processor 302. In some embodiments additional functions that are described herein with relation to a provisioning server may be provided or performed at enhanced eNodeB 300, at processor 302, in the provisioning control module 330 or provisioning security module 332, or in another module.

Processor 302 and baseband processor 306 are in communication with one another. Processor 302 may perform routing functions, and may determine if/when a switch in network configuration is needed. Baseband processor 306 may generate and receive radio signals for both radio transceivers 310 and 312, based on instructions from processor 302. In some embodiments, processors 302 and 306 may be on the same physical logic board. In other embodiments, they may be on separate logic boards.

The first radio transceiver 310 may be a radio transceiver capable of enabling and providing LTE eNodeB functionality, and may be capable of higher power and multi-channel OFDMA. The second radio transceiver 312 may be a radio transceiver capable of providing LTE UE functionality. Both transceivers 310 and 312 are capable of receiving and transmitting on one or more LTE bands. In some embodiments, either or both of transceivers 310 and 312 may be capable of providing both LTE eNodeB and LTE UE functionality. Transceiver 310 may be coupled to processor 302 via a Peripheral Component Interconnect-Express (PCI-E) bus, and/or via a daughtercard. As transceiver 312 is for providing LTE UE functionality, in effect emulating a user equipment, it may be connected via the same or different PCI-E bus, or by a USB bus, and may also be coupled to SIM card 318.

SIM card 318 may provide information required for authenticating the simulated UE to the evolved packet core (EPC). When no access to an operator EPC is available, a local EPC on the enhanced eNodeB itself (not shown) may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 300 is not an ordinary UE but instead is a special UE for providing backhaul to device 300.

In some embodiments, first radio transceiver 312 may be in communication with a first radio frequency filter, a first radio frequency amplifier, and a first radio frequency antenna. In some embodiments, second radio transceiver 312 may be in communication with a second radio frequency filter, a second radio frequency amplifier, and a second radio frequency antenna. In some embodiments, first and second radio transceivers 312 and 314 may share filter, amplifier, and/or antenna resources, or may request provisioning of one or more of the resources of the other transceiver.

In some embodiments, a control connection may be provided to one or more of the filter, amplifier, and antenna in order to enable frequency passband configuration of a tunable filter or amplifier, to control the directionality of an antenna, or to enable provisioning or configuration of parameters so that the radio transceivers and radio signal chains may be used flexibly as requested by a provisioning system as described herein. These control connections are shown in FIG. 3 as dotted lines 322 and 324, paired with the shown solid lines indicating data or RF signal connections. In some embodiments, a programmable chip may be used to write to individual memory registers or memory locations, using a serial peripheral interface (SPI) bus, an inter-IC (I2C) bus, or another digital serial interface to enable control of tunable filters, amplifiers, and antennas. In some embodiments, in operation, when a frequency band or other radio characteristic of the base station is changed, particularly via reconfiguration or remote provisioning, the control connection may be used, and each of the filter, amplifier, and antenna may be reconfigured, appropriately for the new frequency or radio characteristic as understood by one skilled in the art.

Wired backhaul or wireless backhaul may be used by eNodeB 300, in some embodiments. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 310 and 312, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 302 for reconfiguration.

In some embodiments, the wired and/or wireless backhaul may be presented as resources for remote provisioning. In some embodiments, the capacity, measured throughput, congestion, utilization, or other usage parameters of the wired and/or wireless backhaul may be tracked and used to determine whether the backhaul resources are being heavily utilized, in which case additional backhaul resources may be requested to be provisioned, or to determine whether the backhaul resources are less utilized, in which case the unused backhaul capacity may be offered as a resource for other nodes to request provisioning thereof, or both. Tracking may occur at a provisioning and coordination server, such that the provisioning server may be responsible for identifying both resources requested to be activated and resources that are currently inactive but could be activated.

Other elements and/or modules may also be included, such as a home eNodeB, a local gateway (LGW), or another module. Additional radio amplifiers, radio transceivers and/ or wired network connections may also be included. For example, any number of additional radio transceiver chains (e.g., transceiver, filter, amplifier, antenna) may be added, and each individual transceiver chain may be provisioned remotely as described herein. As another example, any number of processors or processor cores, including both general purpose and baseband processors and processor cores, may be included, with some being designated as inactive, and enabled to be remotely provisioned and activated as described herein.

Figure 4:
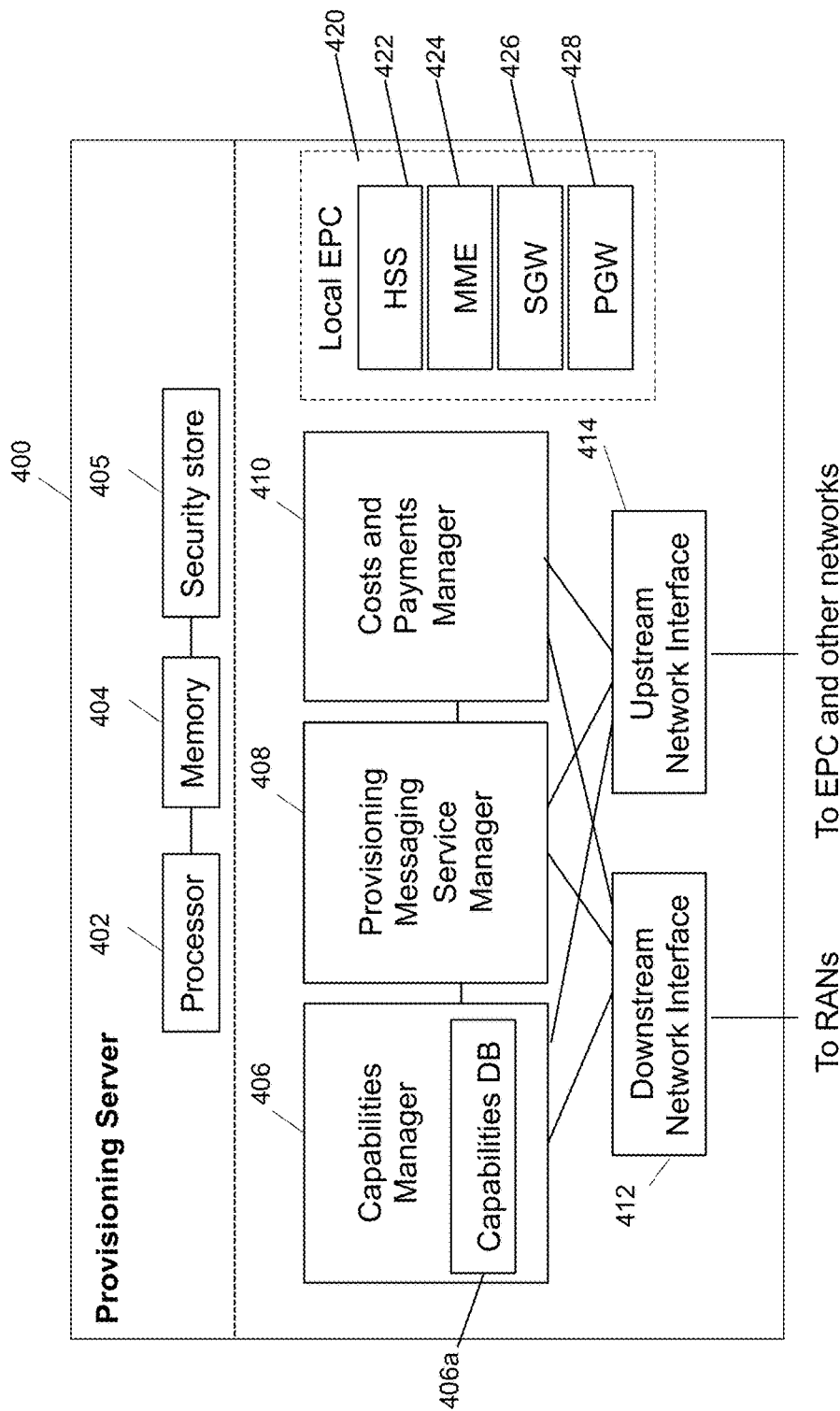
FIG. 4 is a block diagram of a coordinating node, in accordance with some embodiments.

FIG. 4 is a block diagram of a provisioning server, in accordance with some embodiments. Provisioning server 400 includes processor 402 and memory 404, which are configured to provide the functions described herein. In some embodiments, security store 405 is present and contains security information, such as keys used for encryption or authentication, in a special area separate from the processor and memory, which may have additional security or which may have unique contents written prior to deployment, or both. Also present are capabilities manager 406, which includes capabilities database 406a; provisioning messaging service manager 408; and costs and payments manager 410. Provisioning server 400 is intended to be used in conjunction with enhanced eNodeB 300.

Capabilities manager 406 may maintain, in capabilities database 406a, a list of capabilities of each device managed by provisioning server 400, including both capabilities that are provisioned/activated and those that are not currently provisioned/activated, and including across all known nodes in the network. This database may be a distributed database as known in the art. When a device is provisioned, capabilities manager 406 may use its position in the network as provisioning broker to keep this list up to date and determine appropriate prices at which to buy and sell. Capabilities manager 406 may share its information with other servers, in some embodiments. Capabilities manager 406 may also keep track of the types of capabilities in the system generally, as well as specific resources that are provisioned or not provisioned. For example, capabilities manager 406 may register when a node has extra capacity to be sold, what other services can be bought, and what appropriate prices are for buying or selling resources and capabilities. In some embodiments, capabilities manager 406 may provide a back-end database for a distributed resource "app store," enabling third parties to pay for resources.

Provisioning messaging service manager 408 may send and receive messages to and from nodes, including devices that are being provisioned, and including third party nodes that are negotiating the use of resources. Manager 408 may encrypt and decrypt messages and otherwise perform security functions.

Costs and payments manager 410 may initiate, terminate, execute, negotiate, wait on, and otherwise perform functions relating to payment of funds to and from a third party. Costs and payments manager 410 may also, in some embodiments, perform costing, modeling, and auction steps to determine prices. Costs and payments manager 410 may vary the costs based on any criteria and may retain its own and third parties' costing information for future reference.

In some embodiments, provisioning server 400 may also provide proxying, routing virtualization and RAN virtualization, including X2, S1, and S2a proxying, via module 408. In some embodiments, provisioning server 400 may also be a security gateway. In some embodiments, a downstream network interface 412 is provided for interfacing with the RANs, which may be a radio interface (e.g., LTE), and an upstream network interface 414 is provided for interfacing with an operator core network, such as an evolved packet core (EPC), or with any other network upstream from provisioning server 400, which may be either a radio interface (e.g., LTE) or a wired interface (e.g., Ethernet). In some embodiments, provisioning server 400 may be located on the Internet or on the other side of a network gateway, as shown in FIG. 1.

Provisioning server 400 may include local evolved packet core (EPC) module 420, for authenticating users, storing and caching priority profile information, and performing other EPC-dependent functions when no backhaul link is available. Local EPC 420 may include local HSS 422, local MME 424, local SGW 426, and local PGW 428, as well as other modules. Local EPC 420 may incorporate these modules as software modules, processes, or containers. Local EPC 420 may alternatively incorporate these modules as a small number of monolithic software processes. Modules 406, 408, 410 and local EPC 420 may each run on processor 402 or on another processor, or may be located within another device.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems. Wherever IMSI or IMEI are mentioned, other hardware, software, user or group identifiers, can be used in conjunction with the techniques described herein.

Those skilled in the art will recognize that multiple hardware and software configurations could be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention could be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

In the present disclosure, the words location and position may be used in various instances to have the same meaning, as is common in the relevant art.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, in various orders as necessary.

Although the above systems and methods for providing interference mitigation are described in reference to the Long Term Evolution (LTE) standard, one of skill in the art would understand that these systems and methods could be adapted for use with other wireless standards or versions thereof. For example, certain methods involving the use of a virtual cell ID are understood to require UEs supporting 3GPP Release 11, whereas other methods and aspects do not require 3GPP Release 11.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an ARM or x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for increasing network capacity in a wireless communications device, comprising:
determining, at the wireless communications device, a need for activation of an unused functionality of an embedded hardware portion at the wireless communications device to increase network capacity;
receiving, at a provisioning server, an activation request message from the wireless communications device for activation of the unused functionality at the wireless communications device;
determining, at the provisioning server, a path to the wireless communications device based on messages from a plurality of wireless communication devices and based on performance factors;
sending a negotiating message from the provisioning server to another server to determine pricing for granting a license to enable the unused functionality;
granting, at the provisioning server, the license to the unused functionality within the wireless communications device, thereby allowing the unused functionality otherwise not available to be made available for use; and
sending, to the wireless communications device, an activation response message over the determined path to the wireless communications device, the activation response message for enabling the unused functionality of the wireless communications device at the wireless communications device;
wherein the performance factors comprise available network capacity,
thereby provisioning the unused functionality of the embedded hardware portion of the wireless communications device and addressing the need of the wireless communications device for increased network capacity.

2. The method of claim 1, wherein the activation response message may be sent in-band or out-of-band.

3. The method of claim 1, wherein licenses may be required for any functions present as functional modules on a given device.

4. The method of claim 1, wherein the unused functionality enabled by the activation response message comprises logical modules of a system-on-chip (SOC).

5. The method of claim 1, wherein the unused functionality enabled by the activation response message comprises functionality present in a system or a chip.

6. The method of claim 1, wherein the unused functionality enabled by the activation response message comprises individual chips present within a system.

7. The method of claim 1, wherein the unused functionality enabled by the activation response message comprises one or more devices or chips that are added to a system after its initial purchase.

8. The method of claim 1, wherein the unused functionality enabled by the activation response message comprises one or more functions of a software-defined radio (SDR).

9. The method of claim 1, wherein the unused functionality enabled by the activation response message comprises one or more functions of a digital signal processing (DSP) core.

10. The method of claim 1, wherein an online store may be used to enable activation messages, and licenses or license codes may be sold via the online store.

11. The method of claim 1, wherein the activation message may be sent to a specified device via an activation server.

12. The method of claim 1, wherein the activation message enable or disable use of an additional frequency band.

13. The method of claim 1, wherein the activation message causes a tunable filter to be tuned to facilitate filtering of frequencies being transmitted or received on a particular frequency band other than an enabled additional frequency band.

14. The method of claim 1, wherein the activation messages enable or disable a time division duplexing mode, a frequency division duplexing mode, a 3G radio interface, a 4G Long Term Evolution (LTE) radio interface, or a Wi-Fi radio interface.

15. The method of claim 1, further comprising storing, at the wireless communications device, licensing information.

16. The method of claim 1, wherein the performance factors further comprise one or more of: application type, typical network capacity, current network capacity, available network capacity at a given node; availability of spectrum at a given location; total available network capacity, wireless signal strength; and rate of speed of a moving base station.

17. The method of claim 1, wherein pricing is determined based on route costing involving one or both of: marginal value of freed capacity; and marginal cost of newly-provisioned capacity.

18. The method of claim 1, further comprising determining the pricing based on license fees paid by a network operator or consumer for a particular network link.

19. The method of claim 1, further comprising sending deactivation messages to the wireless communications device.

* * * * *